April 8, 1941.                A. R. WILLIAMS                2,237,619
                                LINE CLAMP
                             Filed Nov. 12, 1940
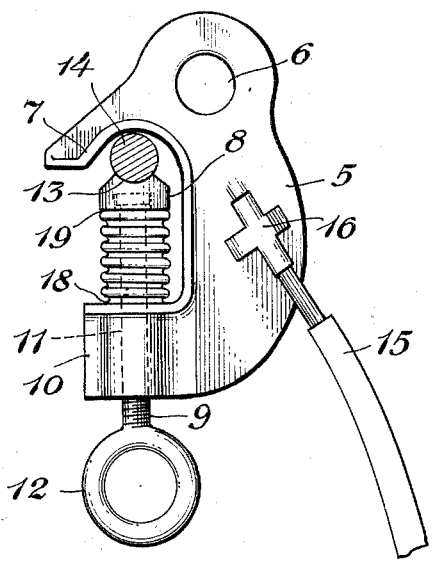
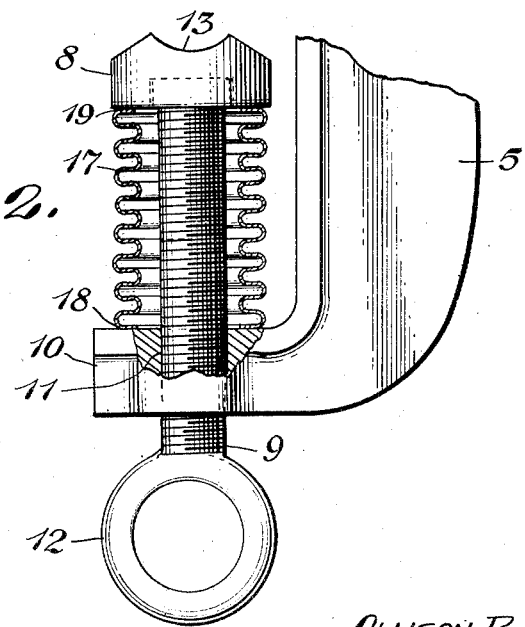
INVENTOR.
ALLISON R. WILLIAMS.
BY Patented Apr. 8, 1941

2,237,619

UNITED STATES PATENT OFFICE 2,237,619

LINE CLAMP

Allison R. Williams, Yazoo City, Miss.

Application November 12, 1940, Serial No. 365,367

3 Claims. (Cl. 173—273)

This invention relates to line clamps and particularly to clamps used in making detachable connections to live lines such as electric power transmission on distribution lines. The invention is concerned more particularly with a structure which provides for ready and positive detachment when it is desired to disconnect the clamp from the line.

It is customary in making transmission or distribution line connections to transformers, lightning arresters and the like, to utilize a detachable clamp often referred to as a live line clamp which is positioned over the line and clamped in place by an insulated or live line stick. A flexible connection leading from the clamp connects either to a transformer, a fuse, or other protective device. The tendency of modern practice is to utilize such clamps as a switching means for disconnecting a transformer whenever repairs or replacements are to be made, and since the clamps are exposed to weather with its corroding effects, it frequently happens that the clamp breaks when an attempt is made to loosen it. This leads to extreme difficulty in removing the broken parts and placing a new clamp in position where the work must be carried on in proximity to a live line.

The object of the present invention is to provide a clamp in which the threads or other operating parts of the clamp are protected against corrosion, and the clamp may be detached readily under all conditions. Other objects and advantages will appear from the accompanying description and the drawing, in which:

Figure 1 is a side elevation showing a clamp of the present invention attached to a transmission or distribution line conductor; and Fig. 2 is an enlarged fragmentary view with the protective device shown in section.

In the drawing reference character 5 designates the body of a line clamp having a supporting eye 6, a fixed hook-like jaw 7, and a movable jaw 8. Swivelled to the movable jaw 8 is a threaded shank 9 passing through a threaded opening 11 in arm 10 of the clamp body and terminating in an actuating member here shown as an eye 12. The movable jaw 8 is grooved at 13 to engage the rounded surfaces of a line conductor 14 when the clamp is tightened as shown in Fig. 1. The usual flexible connection 15 from the clamp is secured to the body as at 16.

When the clamp is in use the threaded shank 9 is exposed to the weather and subject to corrosion, and when the eye 12 is turned to loosen the clamp the shank frequently breaks at its threaded connection 11. Hence it is proposed according to the present invention to surround the shank 9 above the arm 10 with a sealing and enclosing flexible metal bellows 17 of usual construction and capable of contraction and expansion as the movable jaw 8 is lowered and raised. The bellows is attached, as by soldering, to the arm 10 of the clamp at 18 and to the movable jaw at 19 so that in effect the shank 9 between the movable jaw 13 and the arm 10 is hermetically sealed against the entrance of air, water or other corrosive agents. While mere protective enclosure may be sufficient it is preferred to place within the bellows 17 a small amount of oil, graphite or other lubricant which will keep the shank 9, and especially its threaded connection 11 to arm 10, lubricated and protected against corrosion or other deterioration which might tend to weaken the shank and cause the breakage which has been prevalent heretofore.

It will be clear that with the present invention the placing of the clamp and tightening or loosening of the same may be carried out in the usual manner. The bellows may be attached to existing structures to provide the benefits of the present invention and whenever it is necessary to remove the clamp it will be found that the protected shank will move readily through the arm of the clamp without binding or breakage, thus ensuring long life and continued effectiveness of the clamp.

The invention has been described as applied to transmission or distribution line conductors, but it is obvious that it may be applied to other live conductors to which electrical connection is to be made by means of a clamp of the character described.

What is claimed is:

1. A line clamp comprising a hook-like body having a fixed jaw formed integrally therewith; a shank passing through the body in opposed relation to the fixed jaw and terminating in an actuating member; a movable jaw connected to the end of the shank; means forming an actuating connection between said shank and said body for moving said movable jaw toward and from the fixed jaw upon manipulation of the member; and a flexible bellows enclosing said shank between the clamp body and the movable jaw and hermetically sealed to both said jaw and said body.

2. A line clamp comprising a body having a hook-like fixed jaw adapted to support the body on a line conductor, and having an arm spaced from said jaw; a shank threaded through said arm in opposed relation to said fixed jaw, said shank terminating in an actuating member beyond said arm and remote from said fixed jaw; a movable jaw swivelled to the threaded end of the shank within said arm and movable toward and from the fixed jaw; and a metal bellows surrounding said shank and attached to both said arm and said movable jaw and forming a sealed chamber around said shank between said arm and said movable jaw.

3. A line clamp comprising a clamp body having two spaced arms, one arm being arranged as a fixed jaw to be supported by a line conductor with the other arm disposed in opposed relation to it; a movable jaw; means carried by said other arm and connected to said movable jaw to move said jaw into and out of clamping relation to the fixed jaw; a member extending from said other arm and operatively connected to said jaw moving means for actuating the same; and means connected to said movable jaw and to said other arm for enclosing and hermetically sealing said jaw moving means between the movable jaw and the other arm, said enclosing means being effective in both clamping and release positions of said movable jaw and permitting free movement thereof toward and away from said fixed jaw.

ALLISON R. WILLIAMS.